C. H. PROTT.
DEVICE FOR SPRAYING LIQUIDS AND MOISTENING AIR.
APPLICATION FILED JAN. 18, 1912.

1,024,281.

Patented Apr. 23, 1912.

Witnesses
Chas J. Wright
Helen Nafer

Inventor.
Carl Heinrich Prott

UNITED STATES PATENT OFFICE.

CARL HEINRICH PRÖTT, OF RHEYDT, GERMANY.

DEVICE FOR SPRAYING LIQUIDS AND MOISTENING AIR.

1,024,281.     Specification of Letters Patent.    Patented Apr. 23, 1912.

Application filed January 18, 1912. Serial No. 671,780.

*To all whom it may concern:*

Be it known that I, CARL HEINRICH PRÖTT, a citizen of the German Empire, residing at Rheydt, in the Province of Rhenish Prussia, Germany, have invented certain new and useful Improvements in Devices for Spraying Liquids and for Moistening Air, of which the following is a specification.

This invention relates to a device for spraying liquids and for moistening air, in the case of which a stream of air passes between rotating annular disks or rings which dip into a liquid, and the invention consists in each pair of these annular disks being so connected with one another near their inner edges that a circular inwardly flanged channel is formed, into which the water which has collected by deposition in the delivery-pipe or fresh water is led. The liquid is sprayed from the entire circumference of the annular disks after overflowing the edges of the channels. The advantages thereby secured are, that not only is the liquid sprayed more uniformly around the annular disks than hitherto but also that the deposited water and the fresh water do not need to be raised because the liquid is not first returned into the lower part of the casing serving as the receiving chamber for the liquid, so that there is considerable saving in power.

One embodiment of the present invention is illustrated by way of example, in the accompanying drawing, in which:—

Figure 1:
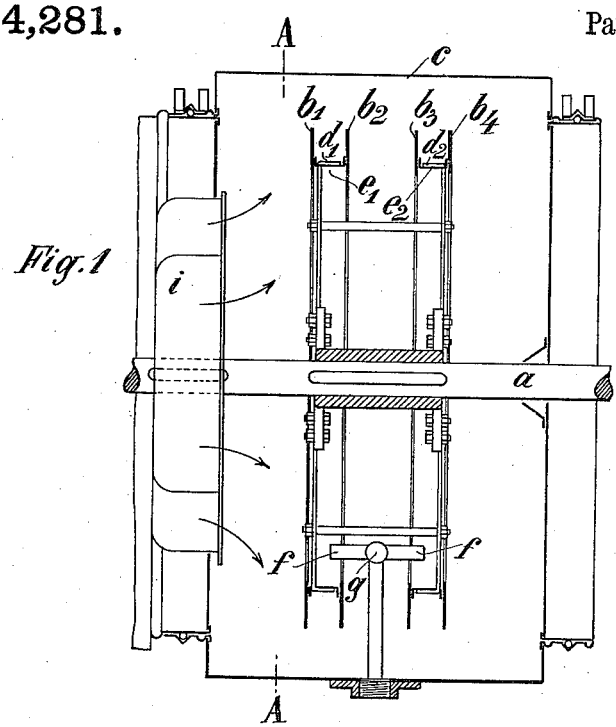
Figure 2:
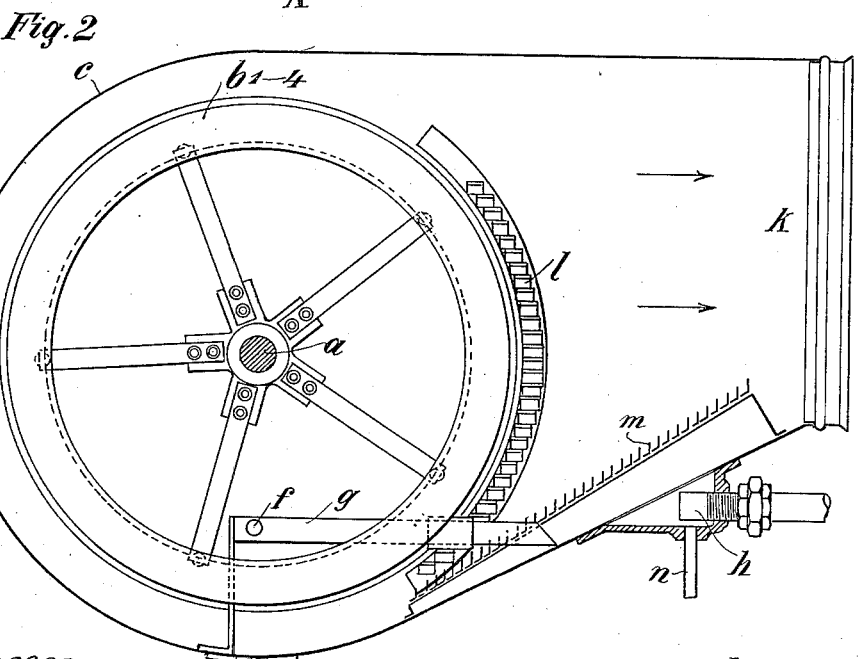

Figure 1 is a vertical longitudinal cross-section and Fig. 2 a vertical transverse cross-section on the line A—A, Fig. 1.

On the shaft $a$, a number of annular disks $b_1$ are mounted and are inclosed by a housing $c$. The lower portion of the housing is used as a receptacle for the liquid to be sprayed, into which liquid dip the annular disks $b_1$—$b_4$, which serve for spraying the liquid. Each pair of these annular disks is so connected by means of a connecting-piece or yoke-ring $d_1$ or $d_2$ that a circular channel $e_1$ or $e_2$ with inwardly projecting flanges is formed by each yoke-ring and the contiguous inner edges of the annular disks. Into this channel is conducted the deposited liquid which has collected in the delivery pipe or fresh water, and when the channel has been so filled, the liquid is sprayed uniformly over and around the inner edges of the annular disks. The liquid is supplied to these channels through the open ends of the two pipes $f$ which are connected to the pipe $g$, which receive both the deposited water collected in the delivery-pipe through the pipe $h$ and also the fresh water through the pipe $n$. On the same shaft a ventilating fan $i$ is suitably mounted and this drives the air in the direction indicated by the arrows between and among the spraying annular disks through into the delivery-pipe $k$. In order that the liquid may be still more efficiently sprayed a system of baffle plates $l$ or the like can be used either partly or wholly surrounding the annular disks, as well as a system of substantially vertical plates or the like shown at $m$.

What I claim as my invention and desire to secure by Letters Patent is:—

1. A device for spraying liquids and moistening air comprising in combination a housing containing liquid, a plurality of revoluble annular disks in said housing and dipping into the liquid in the same, rings interconnecting said annular disks in pairs at a short distance from their inner edges and thereby forming annular channels, means for supplying liquid to said channels, means for driving air among and between said annular disks and means for rotating said revoluble annular disks.

2. A device for spraying liquids and moistening air comprising in combination a housing containing liquid, a plurality of revoluble annular disks in said housing and dipping into the liquid in the same, rings interconnecting said annular disks in pairs at a short distance from their inner edges and thereby forming annular channels, means for conducting back to said channels liquid deposited outside the housing and fresh liquid, means for driving air among and between said annular disks, and means for rotating said revoluble annular disks.

3. A device for spraying liquids and moistening air comprising in combination a housing containing liquid, a plurality of revoluble annular disks in said housing and dipping into the liquid in the same, rings interconnecting said annular disks in pairs at a short distance from their inner edges and thereby forming annular channels, means for supplying liquid to said channels, a fan for driving air among and between said annular disks and means for rotating said revoluble annular disks.

4. A device for spraying liquids and moistening air comprising in combination a housing containing liquid, a plurality of revoluble annular disks in said housing and dipping into the liquid in the same, rings interconnecting said annular disks in pairs at a short distance from their inner edges and thereby forming annular channels, means for supplying liquid to said channels, means for driving air among and between said annular disks, a plurality of baffle-plates in proximity to the peripheries of the annular disks, and means for rotating said revoluble annular disks.

5. A device for spraying liquids and moistening air comprising in combination a housing containing liquid, a plurality of revoluble annular disks in said housing and dipping into the liquid in the same, rings interconnecting said annular disks in pairs at a short distance from their inner edges and thereby forming annular channels, means for supplying liquid to said channels, means for driving air among and between said annular disks, a plurality of baffle-plates in proximity to the peripheries of the annular disks and a plurality of vertical plates $m$ at a short distance from said disks, and means for rotating said revoluble annular disks.

In testimony whereof, I have signed my name to this specification in the presence of two subscribing witnesses.

CARL HEINRICH PRÖTT. [L. S.]

Witnesses:
CHAS. J. WRIGHT,
HELEN NUFER.

Copies of this patent may be obtained for five cents each, by addressing the "Commissioner of Patents, Washington, D. C."